(12) United States Patent
Ito

(10) Patent No.: US 11,403,151 B2
(45) Date of Patent: Aug. 2, 2022

(54) AUTO-SCALE PERFORMANCE ASSURANCE SYSTEM AND AUTO-SCALE PERFORMANCE ASSURANCE METHOD

(71) Applicant: Nippon Telegraph and Telephone Corporation, Tokyo (JP)

(72) Inventor: Yoshito Ito, Tokyo (JP)

(73) Assignee: Nippon Telegraph and Telephone Corporation, Tokyo (JP)

( * ) Notice: Subject to any disclaimer, the term of this patent is extended or adjusted under 35 U.S.C. 154(b) by 0 days.

(21) Appl. No.: 17/423,958

(22) PCT Filed: Jan. 17, 2020

(86) PCT No.: PCT/JP2020/001415
§ 371 (c)(1),
(2) Date: Jul. 19, 2021

(87) PCT Pub. No.: WO2020/158437
PCT Pub. Date: Aug. 6, 2020

(65) Prior Publication Data
US 2022/0091900 A1   Mar. 24, 2022

(30) Foreign Application Priority Data
Jan. 30, 2019 (JP) .............................. JP2019-014761

(51) Int. Cl.
*G06F 9/50* (2006.01)
*H04L 41/5054* (2022.01)
*H04L 41/16* (2022.01)

(52) U.S. Cl.
CPC ........ *G06F 9/5077* (2013.01); *H04L 41/5054* (2013.01)

(58) Field of Classification Search
CPC ............... G06F 9/5077; H04L 41/5054; H04L 41/0806; H04L 41/0813; H04L 41/0823;
(Continued)

(56) References Cited

U.S. PATENT DOCUMENTS

| 5,745,652 A * | 4/1998 | Bigus ..................... G06F 9/5011 |
| | | 706/14 |
| 2008/0222646 A1* | 9/2008 | Sigal ...................... G06F 9/505 |
| | | 718/105 |

(Continued)

OTHER PUBLICATIONS cloud.nifty.com, "Nifkula Specification and Functions," retrieved on Dec. 13, 2017, retrieved from URL <https://cloud.nifty.com/service/autoscale.htm>, 11 pages (With English Translation).

(Continued)

*Primary Examiner* — Richard G Keehn
*Assistant Examiner* — Hassan A Khan
(74) *Attorney, Agent, or Firm* — Fish & Richardson P.C.

(57) ABSTRACT

An autoscale-type performance assurance system performs autoscaling to increase or reduce the number of VMs/containers V1 to V4 generated in a server and resources of V1 to V4. A compute includes a plurality of types of V1 to V4, a data collection unit that collects a resource allocation amount of V1 to V4, and a resource control unit that performs autoscaling to increase or reduce the amount of resources of V1 to V4 according to a resource control amount. A controller includes a dependency calculation unit that calculates, based on the collected resource allocation amount, a degree of dependency indicating whether the resource allocation amount is dependent on a performance related to V1 to V4 for providing a communication service quality, and an autoscaling determination unit that obtains a resource control amount for increasing or reducing only resources related to the calculated degree of dependency indicating being dependent.

8 Claims, 14 Drawing Sheets

(58) Field of Classification Search
CPC ............. H04L 41/0816; H04L 41/0876; H04L 41/0853; H04L 41/16; H04L 41/14; H04L 41/30; H04L 41/5009; H04L 43/08
See application file for complete search history.

(56) References Cited

U.S. PATENT DOCUMENTS

| | | | |
|---|---|---|---|
| 2013/0007254 A1* | 1/2013 | Fries | G06F 9/45558 709/224 |
| 2013/0174146 A1* | 7/2013 | Dasgupta | G06F 9/5077 718/1 |
| 2014/0207425 A1* | 7/2014 | Yeung | G06F 30/20 703/2 |
| 2014/0317293 A1* | 10/2014 | Shatzkamer | H04L 41/5054 709/226 |
| 2015/0026108 A1* | 1/2015 | Portegys | H04L 67/1002 706/21 |
| 2015/0127811 A1* | 5/2015 | Roskind | H04L 47/762 709/224 |
| 2015/0295849 A1* | 10/2015 | Xia | H04L 41/0896 370/235 |
| 2016/0179582 A1* | 6/2016 | Skerry | G06F 9/5027 718/1 |
| 2017/0126792 A1* | 5/2017 | Halpern | H04L 41/147 |

OTHER PUBLICATIONS

Iqbal et al., "SLA-Driven Adaptive Resource Management for Web Applications on a Heterogenous Compute Cloud," CloudCom 2009: Cloud Computing, 2009, Lecture Notes in Computer Science, 5931:243-253.

* cited by examiner

| NUMBER OF VMS/CONTAINERS | | | | PERFORMANCE (LATENCY) |
|---|---|---|---|---|
| V1 | V2 | V3 | V4 | |
| 1 | 1 | 1 | 1 | 200 ms |
| 2 | 1 | 1 | 1 | 180 ms |
| ⋮ | ⋮ | ⋮ | ⋮ | ⋮ |
| 8 | 8 | 8 | 8 | 50 ms |

Fig. 2

| | VM/CONTAINER | | | |
|---|---|---|---|---|
| | V1 | V2 | V3 | V4 |
| SAMPLE CORRELATION COEFFICIENT r (r>0.4 : 1) | 0.6 | 0.1 | 0.0 | 0.8 |
| DEGREE OF DEPENDENCY (DEPENDENT: 1, NOT DEPENDENT: 0) | 1 | 0 | 0 | 1 |

Fig. 3

| NUMBER OF RESOURCE ALLOCATION SETS OF VM/CONTAINER | | | | PERFORMANCE (LATENCY) |
|---|---|---|---|---|
| V1 | V2 | V3 | V4 | |
| 1 | 1 | 1 | 1 | 200 ms |
| 2 | 1 | 1 | 1 | 180 ms |
| ⋮ | ⋮ | ⋮ | ⋮ | ⋮ |
| 8 | 8 | 8 | 8 | 50 ms |

Fig. 5

|  | VM/CONTAINER (NUMBER OF RESOURCE ALLOCATION SETS) | | | |
| --- | --- | --- | --- | --- |
|  | V1 | V2 | V3 | V4 |
| SAMPLE CORRELATION COEFFICIENT r1 (r1>0.4 : 1) | 0.6 | 0.1 | 0.0 | 0.8 |
| DEGREE OF DEPENDENCY (DEPENDENT: 1, NOT DEPENDENT: 0) | 1 | 0 | 0 | 1 |

Fig. 6

|  | VM/CONTAINER | | | |
|---|---|---|---|---|
|  | V1 | V2 | V3 | V4 |
| WEIGHT CONSTANT w (INTEGERIZED) | 2 (w1) | 1 (w2) | 1 (w3) | 3 (w4) |

Fig. 8

|  | VM/CONTAINER (NUMBER OF RESOURCE ALLOCATION SETS) | | | |
|---|---|---|---|---|
|  | V1 | V2 | V3 | V4 |
| WEIGHT CONSTANT wa (INTEGERIZED) | 2 (wa1) | 1 (wa2) | 1 (wa3) | 3 (wa4) |

Fig. 10

AUTO-SCALE PERFORMANCE ASSURANCE SYSTEM AND AUTO-SCALE PERFORMANCE ASSURANCE METHOD

CROSS-REFERENCE TO RELATED APPLICATIONS

This application is a National Stage application under 35 U.S.C. § 371 of International Application No. PCT/JP2020/001415, having an International Filing Date of Jan. 17, 2020, which claims priority to Japanese Application Serial No. 2019-014761, filed on Jan. 30, 2019. The disclosure of the prior application is considered part of the disclosure of this application, and is incorporated in its entirety into this application.

TECHNICAL FIELD

The present invention relates to an autoscale-type performance assurance system and an autoscale-type performance assurance method for autoscaling of the number of virtual machines (VMs) and containers, which are generated in a network-connected server, and resources such as a central processing unit (CPU), a memory, and the like.

BACKGROUND ART

An autoscale-type performance assurance system (also referred to as a system) is configured to use either or both of one or more VMs and containers in a physical server connected to a network. Either or both of VMs and containers will be represented as VMs/containers. VNF network functions virtualization is configured with such VMs/containers.

In addition, a quality of a communication service such as latency or throughput in a network using a plurality of VMs/containers will be referred to as "performance" or "performance value". In other words, good performance indicates a good communication service quality, and poor performance indicates a poor communication service quality.

Autoscaling is a function of automatically increasing or reducing the number of VMs/containers in response to a server load. Autoscaling enables the number of VMs/containers to automatically increase when access is concentrated on a server of a system and the number of VMs/containers to be reduced when there is little access to make the system operate with the optimal number of VMs/containers as much as possible.

Autoscaling includes scale-out in which the number of VMs/containers is increased to enhance server performance, and conversely, scale-in in which the number of VMs/containers is reduced to make the server performance appropriate. Autoscaling further includes scale-up in which resources such as a CPU, memory, or the like are added to VMs/containers to enhance server performance, and conversely, scale-down in which resources of VMs/containers are deleted to make server performance appropriate. Note that scale-out or scale-in will be represented by scale-out/in, and scale-up or scale-down will be represented by scale-up/down. In addition, addition or removal of resources will be expressed as resource addition/removal.

Autoscaling of the system described above is exemplified as the technology of Non Patent Literatures 1 and 2. Non Patent Literature 1 discloses a broad concept of performance control taking a service level objective (SLO) value or performance target value into account. On the other hand, in the specification and function introduced in Non Patent Literature 2, existing autoscaling that is a performance control technique in virtualization technology is designed to determine a scaling opportunity using a prescribed threshold value of a resource use rate for each VM/container. In such autoscaling, a resource allocation amount to the VM/container is changed by resource addition/removal such as a CPU and a memory in scale-up/down or scale-out/in.

CITATION LIST

Non Patent Literature

Non Patent Literature 1: M. G. Jaatun, et al., "SLA-Driven Adaptive Resource Management for Web Applications on a Heterogeneous Compute Cloud", [online], 2009, [retrieved on Jan. 16, 2019], Internet <URL: http://www.cs.ait.ac.th/~mdailey/papers/Iqbal-RTSLA.pdf>

Non Patent Literature 2: Fujitsu Cloud Technologies Limited, "Autoscaling of NIFCLOUD", [online], 2017 to 2019, [retrieved on Jan. 16, 2019], Internet <URL: https://cloud.nifty.com/service/autoscale.htm>

SUMMARY OF THE INVENTION

Technical Problem

However, in the autoscaling technology of Patent Literature 2, the threshold value of the resource use rate, selection of a VM/container as a resource control target, and an amount of control such as an increase or reduction in the number of VMs/containers need to be appropriately stipulated by a person beforehand. There are problems that it is not easy for a person to set stipulation due to required time and effort and the number of VMs/containers and a resource allocation amount cannot be appropriately controlled even when autoscaling control is performed after the stipulation.

In addition, in a VNF constituted by multiple VMs/containers, performance values of latency, throughput, and the like are complicatedly dependent on the number of virtual CPUs (vCPUs) and a capacity of memory of each VM/container and a resource allocation amount such as the number of VMs/containers, and a resource portion that becomes a bottleneck is present as follows.

For example, it is assumed that there are a plurality of VMs/containers V1, V2, . . . , Vk, . . . , and Vn in a VNF as illustrated in FIG. 13. In this case, if a performance value p of the VNF is dependent on resource allocation amounts $rv_1$, $rv_2$, . . . , $rv_k$, . . . , $rv_n$ of the VMs/containers V1, V2, . . . , Vk, . . . , and Vn, respectively, the performance value p is expressed by the following function equation (1).

$$p = f(rv_1, rv_2, ..., rv_k, ..., rv_n) \qquad (1)$$

In such a case in which the performance value p is a function of the resource allocation amounts of the VMs/containers V1, V2, . . . , Vk, . . . , and Vn, the performance value p of the overall VNF cannot be improved even if the resource allocation amount $rv_k$ of the only one VM/container Vk is increased (e.g., increased to three), as illustrated in FIG. 14. The reasons for this are as follows.

As in this example, even if only the resource allocation amount $rv_k$ of the one VM/container Vk is increased to three, the number of other VMs/containers V1, V2, . . . , and Vn is only one, thus the performance values p of these VMs/ containers V1, V2, . . . , and Vn become insufficient, resulting in a bottleneck, and thus performance of the whole VNFs is not improved. In this case, it is only required to increase the number of other VMs/containers V1, V2, . . . , and Vn, but it is not easy to determine the number of resources to increase because it is a manual job and time and effort are required.

Even if autoscaling to increase only the resource allocation amount $rv_k$ of the VM/container Vk is performed as described above, it is not possible to set the performance value of the VNF to the SLO (performance target value). In other words, even if autoscaling is performed, a resource allocation amount such as the number of VMs/containers cannot be appropriately controlled.

The present invention takes the above circumstances into consideration and aims to provide an autoscale-type performance assurance system and an autoscale-type performance assurance method that can appropriately control a resource allocation amount such as the number of VMs/containers using autoscaling.

Means for Solving the Problem

As a means for solving the above-described problems, an invention according to first aspect is an autoscale-type performance assurance system configured to perform autoscaling to increase or reduce, through addition or deletion, the number of VMs/containers, which are either or both of virtual machines (VMs) and containers generated in a network-connected server and resources typified by a central processing unit (CPU) and a memory of each of the VMs/containers, the autoscale-type performance assurance system including a first server including a plurality of types of the VMs/containers, a collection unit configured to collect a resource allocation amount of each of the VMs/containers, and a control unit configured to perform autoscaling to increase or reduce resources of each of the VMs/containers, and a second server including a calculation unit configured to, based on the resource allocation amount that is collected, calculate a degree of dependency indicating whether the resource allocation amount is dependent on a performance related to the VMs/containers for providing a communication service quality, and a determination unit configured to obtain a resource control amount for increasing or reducing only resources related to the degree of dependency indicating being dependent that is calculated, in which the control unit increases or reduces the resources related to the degree of dependency indicating being dependent of the VMs/containers by executing autoscaling according to the resource control amount obtained by the determination unit.

An invention according to eighth aspect is an autoscale-type performance assurance method of a system configured to perform autoscaling to increase or reduce, through addition or deletion, the number of VMs/containers, which are either or both of VMs and containers generated in a network-connected server and resources typified by a CPU and a memory of each of the VMs/containers, in which the system includes a first server in which a plurality of types of the VMs/containers are generated and a second server connected to the first server, the method including, by the first server, collecting a resource allocation amount of each of the VMs/containers, by the second server, based on the resource allocation amount that is collected, calculating a degree of dependency indicating whether the resource allocation amount is dependent on a performance related to the VMs/containers for providing a communication service quality, by the second server, obtaining a resource control amount for increasing or reducing only resources related to the degree of dependency indicating being dependent that is calculated, and by the first server, increasing or reducing the resources related to the degree of dependency indicating being dependent of the VMs/containers by executing autoscaling according to the resource control amount.

According to the configuration of the first aspect and the method of the eighth aspect, based on the resource allocation amount of each of the plurality of types of VMs/containers, whether the resource allocation amount has a degree of dependency on the performance of the VMs/containers is obtained, and only resources in the resource allocation amount corresponding to the degree of dependency indicating being dependent can be increased or reduced by the execution of autoscaling. As a result, it is not necessary to manually set an increase or reduction of resources as in the related art and thus time and effort are not required, and therefore in the present invention, it is possible to appropriately control a resource allocation amount such as the number of VMs/containers by executing (operating) autoscaling.

An invention according to second aspect is the autoscale-type performance assurance system according to first aspect, in which the calculation unit obtains a correlation coefficient between the number of VMs/containers serving as the resource allocation amount and the performance and calculates the degree of dependency, as being dependent, when the correlation coefficient that is obtained exceeds a predetermined threshold value, the determination unit obtains a resource control amount for increasing or reducing only the number of VMs/containers related to the degree of dependency indicating being dependent that is calculated, and the control unit increases or reduces the number of VMs/containers by executing autoscaling according to the resource control amount.

According to this configuration, the following effects are obtained. Normally, if a correlation coefficient between the performance and the number of VMs/containers is large, the performance is improved when the number of VMs/containers is increased. For this reason, a threshold value for determining the correlation coefficient for improving the performance is predetermined, and when the correlation coefficient exceeds the threshold value, only the number of VMs/containers that is a resource allocation amount corresponding to the degree of dependency indicating that the number of VMs/containers is dependent on a performance is increased or reduced. Thus, the performance can be improved according to, for example, the increased number of VMs/containers.

An invention according to third aspect is the autoscale-type performance assurance system according to first aspect, in which the calculation unit obtains a correlation coefficient between the number of resource allocation sets of the VMs/containers serving as the resource allocation amount and the performance and calculates the degree of dependency, as being dependent, when the correlation coefficient that is obtained exceeds a predetermined threshold value, the determination unit obtains a resource control amount for increasing or reducing only the number of resource allocation sets of the VMs/containers related to the degree of dependency indicating being dependent that is calculated, and the control unit increases or reduces the number of resource allocation sets of the VMs/containers by executing autoscaling according to the resource control amount.

According to this configuration, the following effects are obtained. Normally, if a correlation coefficient between the performance and the number of resource allocation sets of the VMs/containers is large, the performance is improved when the number of VMs/containers is increased. For this reason, a threshold value for determining the correlation coefficient for improving the performance is predetermined, and when the correlation coefficient exceeds the threshold value, only the number of resource allocation sets of the VMs/containers that is the resource allocation amount corresponding to a degree of dependency indicating that the number of resource allocation sets is dependent on a performance is increased or reduced. Thus, performance can be improved according to, for example, the VMs/containers for which the number of resource allocation sets is increased.

An invention according to fourth aspect is the autoscale-type performance assurance system according to first aspect, in which the calculation unit obtains a correlation coefficient between the number of VMs/containers serving as the resource allocation amount and the performance and calculates a weight constant for each of the VMs/containers according to the correlation coefficient that is obtained, the determination unit determines the number of each of the VMs/containers to increase or reduce according to the weight constant of each of the VMs/containers that is calculated and obtains a resource control amount for increasing or reducing the number of each of the VMs/containers at a ratio at which the number of each of the VMs/containers is to be increased or reduced, and the control unit increases or reduces the number of VMs/containers by executing autoscaling according to the resource control amount.

According to this configuration, the number of each of the VMs/containers is increased or reduced during execution of autoscaling at the ratio at which the number of each of the VMs/containers is to be increased or reduced according to the ratio of the weight constants for each of the VMs/containers, and thus the overall performance of the VMs/containers can be optimally improved.

An invention according to fifth aspect is the autoscale-type performance assurance system according to first aspect, in which the calculation unit uses the number of resource allocation sets of the VMs/containers to obtain a correlation coefficient between the number of the resource allocation sets and the performance and calculate a weight constant for each of the VMs/containers according to the correlation coefficient that is obtained, the determination unit determines the number of each of the VMs/containers to increase or reduce according to the weight constant of each of the VMs/containers that is calculated and obtains a resource control amount for increasing or reducing the number of resource allocation sets for each of the VMs/containers at a ratio at which the number of each of the VMs/containers is to be increased or reduced, and the control unit increases or reduces the number of resource allocation sets for each of the VMs/containers by executing autoscaling according to the resource control amount.

According to this configuration, the number of resource allocation sets for each of the VMs/containers is increased or reduced during execution of autoscaling at the ratio at which the number of each of the VMs/containers is to be increased or reduced according to the ratio of the weight constants for each of the VMs/containers, and thus the overall performance of the VMs/containers can be optimally improved.

An invention according to sixth aspect is the autoscale-type performance assurance system according to first aspect, in which the calculation unit obtains a correlation coefficient between the number of VMs/containers serving as the resource allocation amount and the performance, defines the degree of dependency when the correlation coefficient that is obtained exceeds a threshold value that is predetermined as being dependent and the degree of dependency when the correlation coefficient that is obtained is equal to or less than the threshold value as being not dependent, and calculates a weight constant for each of the VMs/containers according to the correlation coefficient of each of the VMs/containers being dependent other than VMs/containers being not dependent, the determination unit determines the number of each of the VMs/containers to increase or reduce according to the weight constant of each of the VMs/containers that is calculated and obtains a resource control amount for increasing or reducing the number of each of the VMs/containers at a ratio at which the number of each of the VMs/containers is to be increased or reduced, and the control unit increases or reduces the number of VMs/containers by executing autoscaling according to the resource control amount.

According to this configuration, a VM/container having the correlation coefficient between the number of VMs/containers and performance equal to or less than the threshold value indicating being not dependent is excluded. A weight constant for each of the VMs/containers is calculated according to the correlation coefficient of each of the remaining VMs/containers being dependent, and the number of each of the VMs/containers is increased or reduced at a ratio at which the number of each of the VMs/containers is to be increased or reduced according to the weight constant. Thus, the overall performance of the VMs/containers can be optimally improved.

An invention according to seventh aspect is the autoscale-type performance assurance system according to first aspect, in which the calculation unit obtains a correlation coefficient between the number of resource allocation sets of the VMs/containers serving as the resource allocation amount and the performance, defines the degree of dependency when the correlation coefficient that is obtained exceeds a threshold value that is predetermined as being dependent and the degree of dependency when the correlation coefficient that is obtained is equal to or less than the threshold value as being not dependent, and calculates a weight constant for each of the VMs/containers according to the correlation coefficient of each of the VMs/containers being dependent other than VMs/containers being not dependent, the determination unit determines the number of each of the VMs/containers to increase or reduce according to the weight constant of each of the VMs/containers that is calculated and obtains a resource control amount for increasing or reducing the number of resource allocation sets of each of the VMs/containers at a ratio at which the number of each of the VMs/containers is to be increased or reduced, and the control unit increases or reduces the number of resource allocation sets for each of the VMs/containers by executing autoscaling according to the resource control amount.

According to this configuration, a VM/container having the correlation coefficient between the number of resource allocation sets of the VMs/containers and performance equal to or less than the threshold value indicating being not dependent is excluded. A weight constant for each of the VMs/containers is calculated according to the correlation coefficient of each of the remaining VMs/containers being dependent, and the number of resource allocation sets for each of the VMs/containers is increased or reduced at a ratio at which the number of each of the VMs/containers is to be increased or reduced according to the weight constant. Thus, the overall performance of the VMs/containers can be optimally improved.

Effects of the Invention

According to the present invention, it is possible to provide an autoscale-type performance assurance system and an autoscale-type performance assurance method that can appropriately control a resource allocation amount such as the number of VMs/containers using autoscaling.

BRIEF DESCRIPTION OF DRAWINGS

FIG. 2 is a table showing performance (latency) in a case in which the number of VMs/containers V1 to V4 is any number from "1" to "8".

FIG. 3 is a table showing the sample correlation coefficients and degrees of dependency of the VMs/containers V1 to V4.

FIG. 5 is a table showing performance (latency) in a case in which the number of resource allocation sets (2CPU) of the VMs/containers V1 to V4 is any number from "1" to "8".

FIG. 6 is a table showing the sample correlation coefficients and degrees of dependency of the number of resource allocation sets of the VMs/containers V1 to V4.

FIG. 8 is a table showing the weight constants for each of the VMs/containers V1 to V4 according to a correlation coefficient between the performance and the number of VMs/containers.

FIG. 10 is a table showing the weight constant of each of the VMs/containers V1 to V4 according to correlation coefficient between the performance and the number of resource allocation sets of the VMs/containers.

DESCRIPTION OF EMBODIMENTS

Hereinafter, an embodiment of the present invention will be described with reference to the drawings.
Configuration of Embodiment FIG. 1 is a block diagram illustrating a configuration of an autoscale-type performance assurance system according to an embodiment of the present invention.

Figure 1:
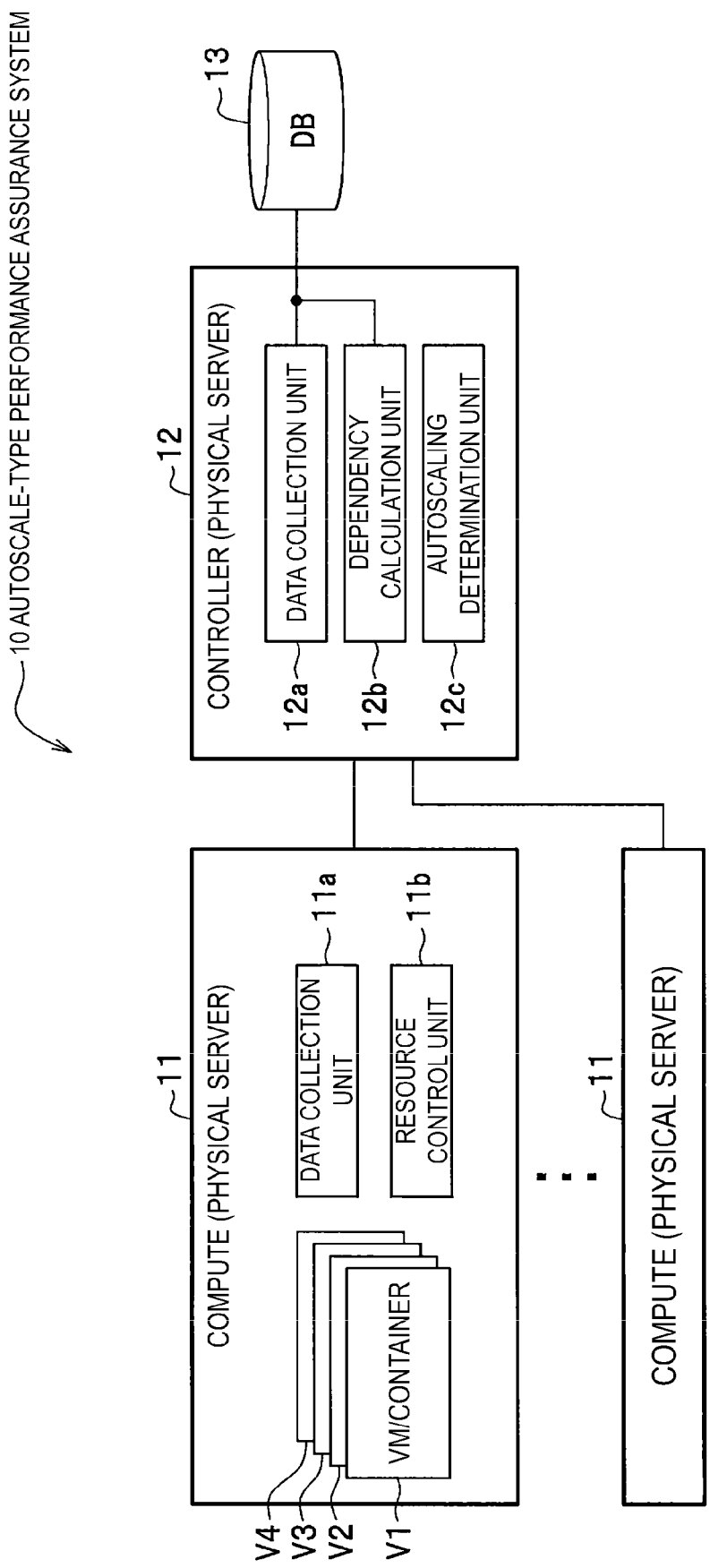
FIG. 1 is a block diagram illustrating a configuration of an autoscale-type performance assurance system according to an embodiment of the present invention.

An autoscale-type performance assurance system (system) 10 illustrated in FIG. 1 is for performing autoscaling triggered by the performance (or a performance value) to provide a communication service quality such as latency or throughput on a network using a plurality of types of VMs/containers. In this autoscaling, because it is meaningless to perform scale-out or scale-up on all VMs/containers constituting the system 10, only a VM/container capable of improving the performance is subject to scale-out and scale-up. Alternatively, only VMs/containers which are expected to have performance at an appropriate value greater than or equal to a predetermined value are subject to scale-in or scale-down.

The system 10 is configured such that a controller 12 is network-connected to a plurality of network-connected computes 11, . . . , and 11. Each of the computes 11 and the controller 12 are configured as physical servers (servers). Note that the computes 11 constitute the first server described in the aspects. The controller 12 constitutes the second server described in the aspects.

However, a server on which VMs/containers V1 to V4 that are virtually created inside operate is defined as a compute 11. The controller 12 is designed to issue an instruction to increase or reduce the number of VMs/containers, and the computes 11 are designed to add or delete the VMs/containers V1 to V4 therein through autoscaling in compliance with the instruction. Note that the VMs/containers V1 to V4 will also be referred to as V1 to V4.

Each compute 11 includes a data collection unit 11$a$, a resource control unit 11$b$, and a plurality of VMs/containers V1 to V4.

The controller 12 includes a data collection unit 12$a$, a dependency calculation unit 12$b$, and an autoscaling determination unit 12$c$. The data collection unit 12$a$ and the dependency calculation unit 12$b$ are connected to a database (DB) 13.

Note that the data collection units 11$a$ and 12$a$ constitute the collection unit described in the aspects. The resource control unit 11$b$ constitutes a control unit described in the aspects. The dependency calculation unit 12$b$ constitutes the calculation unit described in the aspects. The autoscaling determination unit 12$c$ constitutes the determination unit described in the aspects.

The data collection unit 11$a$ of each compute 11 collects data of a resource allocation amount including usage of resources that are resources such as a CPU or a memory of each of the VMs/containers V1 to V4 and notifies the controller 12 of the data. Note that the usage of the resources includes usage such as an amount of CPU usage of the entire physical servers, the number of VMs/containers, and an amount of vCPU usage or an amount of memories used of individual VMs/containers.

The data collection unit 12$a$ of the controller 12 stores the notified data in the DB 13.

Here, in order to improve the performance described above, it is necessary to ascertain an increase ratio (or a reduction ratio) of each of the VMs/containers V1 to V4, and for this, the data collection units 11$a$ and 12$a$ collect data. This is referred to as a data collection phase.

In the data collection phase, the controller 12 instructs the computes 11 to collect data when the VMs/containers configuring a service are generated. In response to this instruction, while changing a resource allocation amount of each of the VMs/containers V1 to V4, the data collection unit 11$a$ of each compute 11 acquires data of the changed resource allocation amount and notifies the data collection unit 12$a$ of the controller 12 of the data. The data collection unit 12$a$ stores the notified data of the resource allocation amount in the DB 13.

When there is a dependency calculation instruction from the data collection unit 12$a$, the dependency calculation unit 12$b$ calculates a dependency relationship (degree of dependency) of a resource allocation amount on the above performance of each of the VMs/containers V1 to V4 based on the data of the resource allocation amount stored in the DB 13. This calculation of the degree of dependency is referred to as a dependency calculation phase.

In the dependency calculation phase, it is clarified how much a resource allocation amount such as the number of V1 to V4, the number of CPUs, or the capacity of a memory depends (how much is involved) on the performance (a performance value). In other words, the dependency calculation unit 12b calculates a degree of dependency for each of V1 to V4, and outputs the calculated degree of dependency to the autoscaling determination unit 12c.

The autoscaling determination unit 12c determines autoscaling based on the calculated degree of dependency as follows. In other words, because performance needs to be set to an appropriate certain performance value or higher, the autoscaling determination unit 12c obtains a resource control amount by which the resources are increased when performance has deteriorated, and by which the resources are reduced when performance has been improved, and notifies the resource control unit 11b of the compute 11 of the resource control amount.

After the dependency calculation phase is performed, the resource control unit 11b executes an operation phase in which resources of each of the VMs/containers V1 to V4 are added/removed (increased and reduced) as follows. In other words, the resource control unit 11b increases or reduces the resources of V1 to V4 using autoscaling, i.e., scale-out/in or scale-up/down, according to the resource control amount notified from the controller 12.

There are the following first to third autoscaling processing operations as processing (autoscaling processing) up to autoscaling execution according to a resource control amount based on such a calculated degree of dependency. The autoscaling processing includes two processing operations of scale-out/in or scale-up/down.

First Autoscaling Processing (Scale-Out/in)

It is assumed that, as a prerequisite for each compute 11, the number of each of the four VMs/containers V1 to V4 is any number from "1" to "8" as shown in the table of a data collection result of FIG. 2. Performance is assumed to be latency.

In the case of this condition, it is assumed that the latency is 200 ms when the number of each of the VMs/containers V1 to V4 is "1", the latency is 180 ms when the number of VMs/containers V1 is "2" and the number of each of the VMs/containers V2 to V4 is "1", and latency is 50 ms when the number of each of the VMs/containers V1 to V4 is "8". This data is collected by the data collection unit 12a of the controller 12 and stored in the DB 13.

Next, based on the data stored in the DB 13, the dependency calculation unit 12b uses a sample covariance Sxy indicating a relationship between two pieces of data of performance y and the number of VMs/containers x and sample standard deviations Sx and Sy representing a size of the variation in the two pieces of data to calculate a sample correlation coefficient r indicating a correlation of the two pieces of data using the following equation (2). Note that the sample covariance is also referred to as a covariance, the sample standard deviation as a standard deviation, and the sample correlation coefficient as a correlation coefficient.

$$r = Sxy/SxSy \quad (2)$$

The correlation coefficient r calculated from equation (2) is "0.6" for the VM/container V1, "0.1" for the VM/container V2, "0.0" for the VM/container V3, and "0.8" for the VM/container V4, as shown in FIG. 3.

Normally, if a correlation coefficient r between the performance y and the number of VMs/containers x is large, performance (latency) is improved when the number of VMs/containers is increased. Thus, a threshold value for determining a correlation coefficient r that enables performance (latency) to be improved is predetermined. For example, it is assumed that the threshold value is set to "0.4".

The dependency calculation unit 12b sets "1" as being dependent for the VMs/containers V1 and V4 because the VMs/containers having the correlation coefficients r of "0.6" and "0.8" exceeding the threshold value "0.4" affect performance (latency). On the other hand, the dependency calculation unit 12b sets "0" as being not dependent for the VMs/containers V2 and V3 because the VMs/containers having the correlation coefficients r of "0.1" and "0.0" equal to or less than the threshold value "0.4" do not affect performance (latency).

That is, a resource control amount can be defined to perform control that the number of VMs/containers V1 and V4 is increased because performance is improved if the number of VMs/containers is increased and the number of VMs/containers V2 and V3 is not increased because performance is not improved even if the number of VMs/containers is increased. In other words, a resource control amount for increasing only V1 and V4 can be defined.

Thus, the autoscaling determination unit 12c obtains a resource control amount for performing control of increasing only the number of VMs/containers V1 and V4 having the calculated degree of dependency "1", and notifies the resource control unit 11b of the compute 11 of the result.

Figure 4:
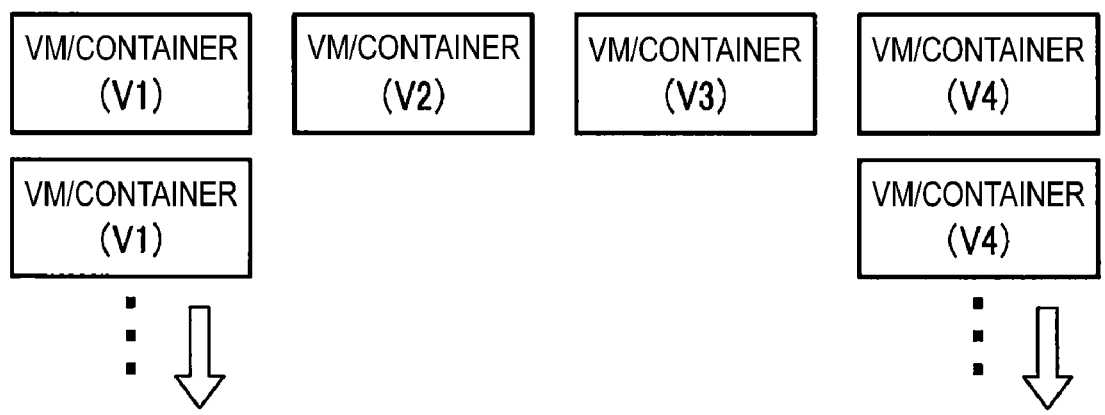
FIG. 4 is a diagram illustrating an operation mode of scale-out in which only the number of VMs/containers V1 and V4 is increased.

The resource control unit 11b performs scale-out control to increase only the number of VMs/containers V1 and V4 as illustrated in FIG. 4 according to the notified resource control amount. The number of VMs/containers V1 and V4 is increased by this control.

When the number of each of the VMs/containers V1 to V4 is to be reduced, scale-in control is likewise performed according to the resource control amount based on the degree of dependency "1" or "0" as described above.

First Autoscaling Processing (Scale-Up/Down)

Figure 7:
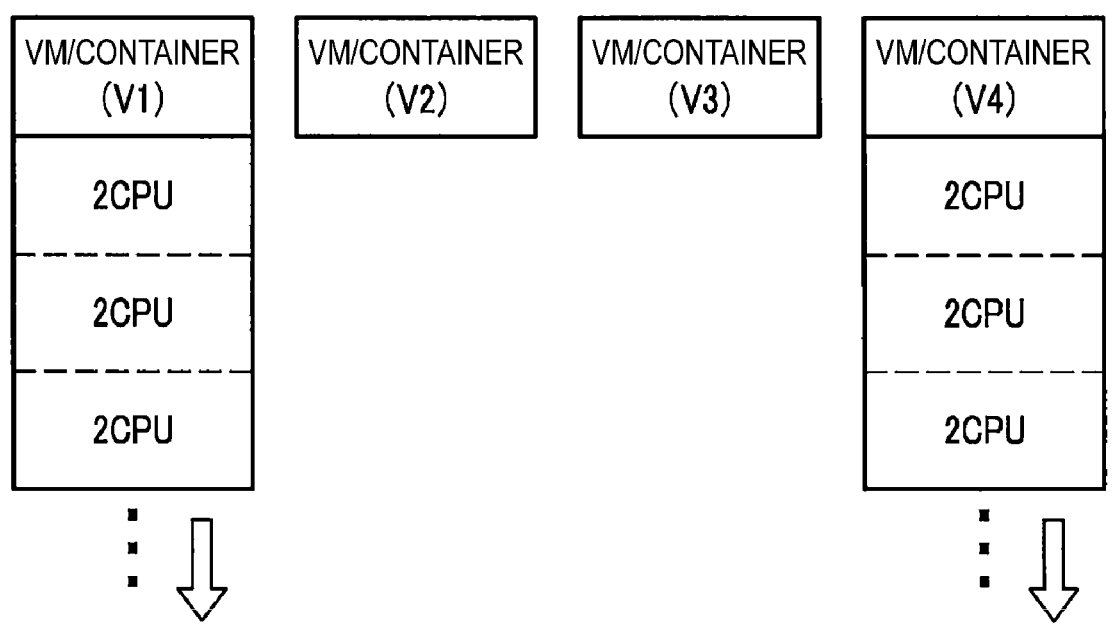
FIG. 7 is a diagram illustrating an operation mode of scale-up in which the number of resource allocation sets (2CPU) of only the VMs/containers V1 and V4 is increased.

Next, it is assumed that, as a prerequisite for each compute 11, the number of resource allocation sets of the VMs/containers V1 to V4 is any number from "1" to "8" as shown in the table of a data collection result of FIG. 5. The number of resource allocation sets refers to the number of CPU sets serving as resources, for example, having two cores. In this case, "1" represents a double-core CPU (represented as a 2CPU), and resources are increased in units of 2CPUs as illustrated in FIG. 7. Hereinafter, the number of resource allocation sets refers to the number of sets in units of 2CPUs.

It is assumed that latency is 200 ms when the number of resource allocation sets of each of V1 to V4 is "1", latency is 180 ms when the number of resource allocation sets of V1 is "2" and the number of resource allocation sets of each of V2 to V4 is "1", and latency is 50 ms when the number of resource allocation sets of each of V1 to V4 is "8", as shown in FIG. 5. This data is collected by the data collection unit 12a of the controller 12 and stored in the DB 13.

Next, based on the data stored in the DB 13, the dependency calculation unit 12b uses a sample covariance Sx1y1 indicating a relationship between two pieces of data of performance y and the number of resource allocation sets xi and sample standard deviations Sx1 and Sy1 representing a size of variation in the two pieces of data to calculate a sample correlation coefficient r1 indicating a correlation of the two pieces of data using the following equation (3).

$$r1 = Sx1y1/Sx1Sy1 \quad (3)$$

The correlation coefficient r1 between the performance y and the number of resource allocation sets x1 calculated from equation (3) is "0.6" for the VM/container V1, "0.1" for the VM/container V2, "0.0" for the VM/container V3, and "0.8" for the VM/container V4, as shown in FIG. 6.

Normally, if the correlation coefficient r1 between the performance y and the number of resource allocation sets x1 is large, performance (latency) is improved when the number of resource allocation sets of the VMs/containers is increased. Thus, a threshold value for determining a correlation coefficient r1 that enables performance (latency) to be improved is predetermined. For example, it is assumed that the threshold value is set to "0.4".

The dependency calculation unit 12b sets "1" as being dependent for V1 and V4 because the number of resource allocation sets of V1 and V4 having the correlation coefficients r1 of "0.6" and "0.8" exceeding the threshold value "0.4" affects performance (latency). On the other hand, the dependency calculation unit 12b sets "0" as being not dependent for V2 and V3 because the number of resource allocation sets of V2 and V3 having the correlation coefficients r1 of "0.1" and "0.0" equal to or less than the threshold value "0.4" does not affect performance (latency).

That is, a resource control amount can be defined to perform control that the number of VMs/containers V1 and V4 is increased because performance is improved if the number of resource allocation sets is increased and the number of VMs/containers V2 and V3 is not increased because performance is not improved even if the number of resource allocation sets is increased. In other words, a resource control amount for increasing only the number of resource allocation sets of V1 and V4 can be defined.

Thus, the autoscaling determination unit 12c obtains a resource control amount for performing control of increasing the number of resource allocation sets only of the VMs/containers V1 and V4 having the calculated degree of dependency "1" shown in FIG. 6 and notifies the resource control unit 11b of the compute 11 of the result.

The resource control unit 11b performs scale-up control to increase the number of resource allocation sets of 2CPUs only of the VMs/containers V1 and V4 as illustrated in FIG. 7 according to the notified resource control amount. The number of resource allocation sets of the 2CPUs of the VMs/containers V1 and V4 is increased by this control.

When the number of resource allocation sets of the VMs/containers V1 to V4 is to be reduced, scale-down control is likewise performed according to the resource control amount based on the degree of dependency "1" or "0" as described above.

Second Autoscaling Processing (Scale-out/in) A prerequisite for each compute 11 in the case of the second autoscaling processing (scale-out/in) is similar to that of the first autoscaling processing described with reference to FIG. 2. Although the VMs/containers V1 to V4 are connected in a row in this case, performance is not improved even if all V1 to V4 are increased by the same number. V1 to V4 may have performance that is improved or not improved according to an increase in the number of VMs/containers as described above.

For this reason, in the second autoscaling processing, among V1 to V4, a VM/container of which the number is desired to be increased and a VM/container which is desired not to increase are weighted according to the above-described correlation coefficient r (see FIG. 3) between the performance y and the number of VMs/containers x, and the number of VMs/containers V1 to V4 are increased or reduced at a proportion according to a weight constant from this weighting.

Thus, the dependency calculation unit 12b obtains the following equation (4) using a weight constant w, with performance denoted by y and the number of VMs/containers denoted by x.

$$y = w1 \times 1 + w2 \times 2 + w3 \times 3 + w4 \times 4 \quad (4)$$

The weight constant w in the above equation (4) is assumed to be set such that a weight constant w1 of V1 is "2", a weight constant w2 of V2 is "1", a weight constant w3 of V3 is "1", and a weight constant w4 of V4 is "3", as shown in FIG. 8.

As the weight constant w increases, the slope becomes steep, and the performance y is more likely to increase, and as the weight constant w decreases, the slope becomes gentle, and the performance y is not likely to increase. In the example of FIG. 8, V4 is likely to have improved performance because a weight constant w4 is "3", and V2 and V3 are not likely to have improved performance because the weight constants w2 and w3 are "1". V1 is likely to have further improved performance than V2 and V3 because the weight constant w1 is "2".

Thus, if V1 is increased by two sets, V2 and V3 are increased by one set, and V4 is increased by three sets according to the weight constants w1 to w4 during an autoscaling operation, the overall performance of the VMs/containers V1 to V4 can be optimally improved.

Thus, the autoscaling determination unit 12c determines the ratio between the weight constants w1 to w4 (2:1:1:3) as a ratio at which the number of the VMs/containers V1 to V4 is to be increased or reduced (2:1:1:3) and obtains a resource control amount for controlling an increase or reduction in the number of VMs/containers at the ratio (2:1:1:3). In the case of the numerical values in FIG. 8, if the number of VMs/containers is increased or reduced at a ratio of V1:V2:V3:V4=2:1:1:3, the overall performance can be optimally improved.

Thus, the autoscaling determination unit 12c obtains a resource control amount for performing control of increasing or reducing the number of VMs/containers at the ratio of V1:V2:V3:V4=2:1:1:3, and notifies the resource control unit 11b of the compute 11 of the result.

Figure 9:
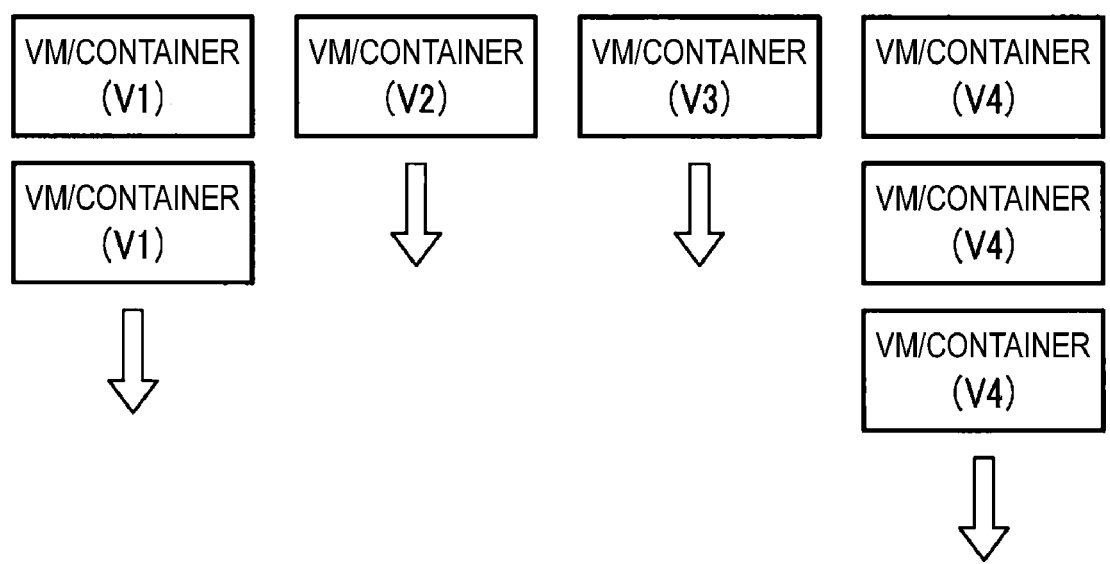
FIG. 9 is a diagram illustrating an operation mode of scale-out in which the number of VMs/containers V1 to V4 is increased according to ratios of a weight constant of each of the VMs/containers V1 to V4.

The resource control unit 11b performs scale-out control to increase V1 by two sets, V2 and V3 by one set, and V4 by three sets as illustrated in FIG. 9 according to the notified resource control amount. The number of each of VMs/containers V1 to V4 is increased according to this control ratio.

When the number of each of the VMs/containers V1 to V4 is to be reduced, scale-in control is likewise performed according to the resource control amount at the ratio of V1:V2:V3:V4=2:1:1:3 as described above.

Second Autoscaling Processing (Scale-Up/Down)

A prerequisite for each compute 11 in the case of the second autoscaling processing (scale-up/down) is similar to that of the first autoscaling processing described with reference to FIG. 5. In this case, each of the VMs/containers V1 to V4 has performance that is improved or not improved according to an increase in the number of resource allocation sets (set as 2CPUs) as described above.

Thus, in the second autoscaling processing, among the VMs/containers V1 to V4, a VM/container of which the number is desired to be increased and a VM/container which is desired not to be increased are weighted according to the above-described correlation coefficient r1 (see FIG. 6) between the performance y and the number of resource allocation sets xi. Thus, the number of resource allocation sets (2CPUs) of the VMs/containers V1 to V4 is designed to increase or reduce at a ratio according to a weight constant obtained by this weighting.

Thus, the dependency calculation unit 12b obtains the following equation (5) using a weight constant wa, with performance denoted by ya and the number of resource allocation sets denoted by xa.

$$ya = wa1 \times a1 + wa2 \times a2 + wa3 \times a3 + wa4 \times a4 \qquad (5)$$

The weight constant w in the above equation (5) is assumed to be set such that a weight constant wa1 of V1 is "2", a weight constant wa2 of V2 is "1", a weight constant wa3 of V3 is "1", and a weight constant wa4 of V4 is "3", as shown in FIG. 10. As the weight constant wa increases, the slope becomes steep, and the performance y is more likely to increase, and as the weight constant wa decreases, the slope becomes gentle, and the performance y is not likely to increase, similarly to the above-described weight constant w.

Thus, if the number of 2CPUs is increased by two sets for V1, increased by one set for V2 and V3, and increased by three sets for V4 during an autoscaling operation, the overall performance of the VMs/containers V1 to V4 can be optimally improved.

Thus, the autoscaling determination unit 12c determines the ratio between the weight constants wa1 to Wa4 (2:1:1:3) as a ratio at which the number of resource allocation sets (2CPU) of each of the VMs/containers V1 to V4 is to be increased or reduced (2:1:1:3) and obtains a resource control amount for controlling an increase or reduction in the number of resource allocation sets at the ratio (2:1:1:3). In the case of the numerical values in FIG. 10, if the number of resource allocation sets is changed at the ratio of V1:V2:V3:V4=2:1:1:3, the overall performance can be optimally improved.

Thus, the autoscaling determination unit 12c obtains a resource control amount for performing control of increasing or reducing the number of resource allocation sets of each of the VMs/containers V1 to V4 at the ratio of V1:V2:V3:V4=2:1:1:3, and notifies the resource control unit 11b of the compute 11 of the result.

Figure 11:
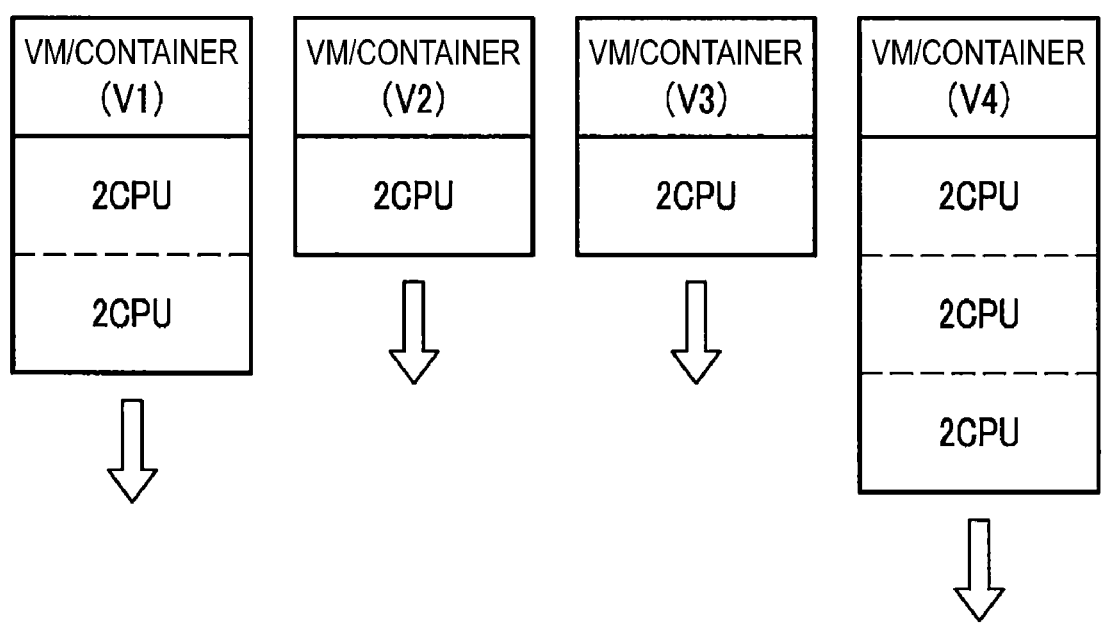
FIG. 11 is a diagram illustrating an operation mode of scale-up in which the number of resource allocation sets (2CPU) of each of the VMs/containers V1 to V4 is increased according to a ratio of the weight constants of the VMs/containers V1 to V4.

The resource control unit 11b performs scale-up control to increase the number of 2CPUs by two sets for V1, by one set for V2 and V3, and by three sets for V4 as illustrated in FIG. 11 according to the notified resource control amount. The number of 2CPUs of each of VMs/containers V1 to V4 is increased according to this control ratio.

When the number of 2CPUs of each of the VMs/containers V1 to V4 is to be reduced, scale-down control is likewise performed according to the resource control amount at the ratio of V1:V2:V3:V4=2:1:1:3 as described above.

Third Autoscaling Processing (Scale-Out/in)

In a third autoscaling processing (scale-out/in), the dependency calculation unit 12b calculates a degree of dependency of each of VMs/containers V1 to V4 to be V1="1", V2="0", V3="0", and V4="1" as shown in FIG. 3, similarly to the first autoscaling processing (scale-out/in) and excludes V2 and V3 having "0" indicating being not dependent among them from autoscaling objects.

Next, the dependency calculation unit 12b uses the remaining V1 and V4 having "1" indicating being dependent to perform weighting of the second autoscaling processing. In this case, it is assumed that a weight constant w1 of V1 is "2" and a weight constant w4 of V4 is "3" as shown in FIG. 8.

Next, the autoscaling determination unit 12c determines a ratio between the weight constants w1 and W4 (2:3) as a ratio at which the number of VMs/containers V1 and V4 is to be increased or reduced (2:3) and obtains a resource control amount for controlling an increase or reduction in the number of VMs/containers at the ratio (2:3). This resource control amount is notified to the resource control unit 11b of the compute 11.

The resource control unit 11b performs scale-out control to increase V1 by two sets and V4 by three sets as illustrated in FIG. 11 according to the notified resource control amount. Only the number of each of VMs/containers V1 and V4 is increased according to this control ratio. When the number of VMs/containers V1 and V4 is to be reduced, scale-in control is likewise performed according to the resource control amount at the ratio of V1:V4=2:3 as described above.

Third Autoscaling Processing (Scale-Up/Down)

In the third autoscaling processing (scale-up/in), the dependency calculation unit 12b calculates a degree of dependency of the number of resource allocation sets (set as 2CPU) of each of the VMs/containers V1 to V4 to be V1="1", V2="0", V3="0", and V4="1" shown in FIG. 6, similarly to the first autoscaling processing (scale-up/down) and excludes V2 and V3 having "0" indicating being not dependent among them from autoscaling objects.

Next, the dependency calculation unit 12b uses the remaining V1 and V4 having "1" indicating being dependent to perform weighting of the second autoscaling processing. In this case, it is assumed that a weight constant wa1 of V1 is "2" and a weight constant wa4 of V4 is "3" as shown in FIG. 10.

Next, the autoscaling determination unit 12c determines a ratio between the weight constants wa1 and Wa4 (2:3) as a ratio at which the number of VMs/containers V1 and V4 is to be increased or reduced (2:3) and obtains a resource control amount for controlling an increase or reduction in the number of resource allocation sets (2CPUs) of V1 and V4 at the ratio (2:3). This resource control amount is notified to the resource control unit 11b of the compute 11.

The resource control unit 11b performs scale-up control to increase 2CPUs by two sets for V1 and by three sets for V4 as illustrated in FIG. 11 according to the notified resource control amount. The number of 2CPUs only of each of VMs/containers V1 and V4 is increased according to this control ratio. When the number of 2CPUs of V1 and V4 is to be reduced, scale-down control is likewise performed according to the resource control amount at the ratio of V1:V4=2:3 as described above.

Operations in Embodiment

Figure 12:
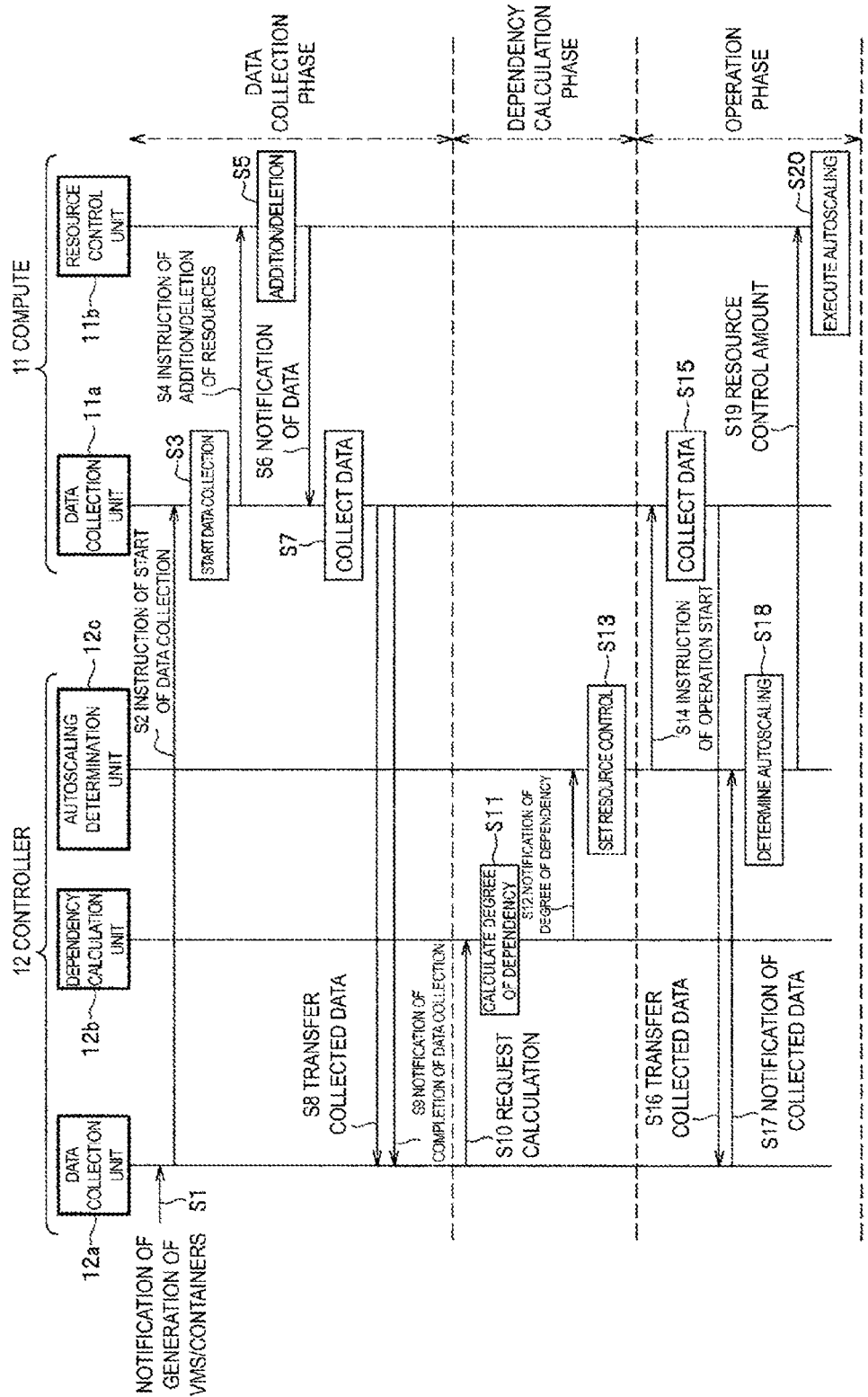
FIG. 12 is a sequence diagram for describing an operation of the autoscale-type performance assurance system according to the present embodiment.
Figure 13:
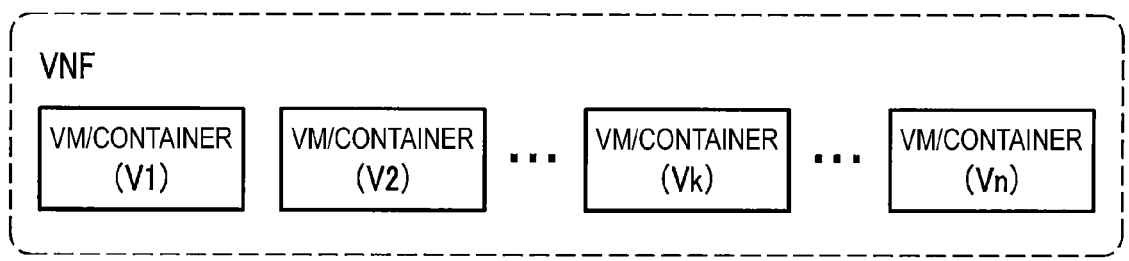
FIG. 13 is a diagram illustrating a plurality of VMs/containers in a VNF.
Figure 14:
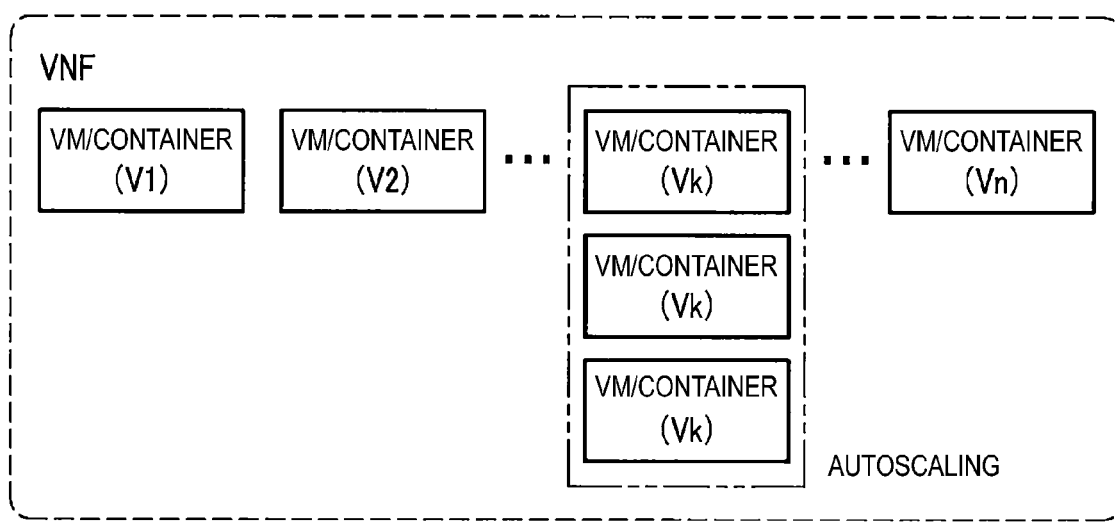
FIG. 14 is a diagram illustrating a mode in which the number of particular VMs/containers among a plurality of VMs/containers in a VNF is increased using autoscaling.

Next, an operation of the autoscale-type performance assurance system according to the present embodiment will now be described with reference to the sequence diagram of FIG. 12. However, the operation in a representative case in which scale-out/in processing of the first autoscaling processing is performed will be described.

It is assumed in step S1 that the compute 11 notifies the data collection unit 12a of the controller 12 of the generation of the VMs/containers V1 to V4 (FIG. 1). After receiving this notification, the data collection unit 12a gives a data collection start instruction to the compute 11 in step S2.

After receiving this notification, the data collection unit 11a of the compute 11 starts collecting data of the number of VMs/containers V1 to V4 generated above and performance values of the resources such as latency and throughput in step S3.

In step S4, the data collection unit gives an increase or reduction instruction (resource addition/removal instruction) to virtually add or remove the resources of each of the VMs/containers V1 to V4 to the resource control unit 11b. In step S5, the resource control unit 11b performs control of virtually adding or removing the resources of V1 to V4 in compliance with the instruction. In this control, the number of VMs/containers V1 to V4 serving as resources is virtually decided as illustrated in FIG. 2, and the data of latency, which is the performance at the time, is obtained. In addition, data of the resources such as an amount of CPU usage of the entire physical server, an amount of CPU usage of the individual VMs/containers, a resource allocation amount, and the like are obtained.

In step S6, the resource control unit 11b notifies the data collection unit 11a of the number of VMs/containers virtually determined by the addition/removal and the data of performance. For example, the data collection unit 11a is notified of the data of "1" that is the number of each of the VMs/containers V1 to V4 and latency=200 ms, which is the performance value at that time, shown in the first row of FIG. 2.

The data collection unit 11a collects the notified data in step S7 and transfers the collected data to the data collection unit 12a of the controller 12 in step S8. This transferred collected data is stored in the DB 13 (FIG. 1).

The processing operations of steps S4 to S8 described above are repeated such that, for example, the number of V1 to V4, shown in FIG. 2 is changed to a value from "1" to "8" and latency at the time of the change is obtained. At that moment, data of the resources in various patterns such as an amount of CPU usage of the entire physical server, an amount of CPU usage of the individual VMs/containers, a resource allocation amount, and the like described above are also obtained. The obtained data is stored in the DB 13.

When a predetermined number of pieces of data in various patterns is collected through the repeated processing operations of steps S4 to S8 above, the data collection unit 11a of the compute 11 notifies the data collection unit 12a of the controller 12 of the completion of the data collection (step S9). The data collection phase ends when the data collection unit 12a receives this notification.

After receiving this notification of the completion of the data collection, the data collection unit 12a requests the dependency calculation unit 12b for calculation of a degree of dependency in step S10. After receiving this request, the dependency calculation unit 12b calculates degrees of dependency of the number of VMs/containers V1 to V4 on the performance (latency) of each of the VMs/containers to be "1" and "0" in step S11 as shown in FIG. 3 based on the collected data stored in the DB 13. The autoscaling determination unit 12c is notified of the calculated degrees of dependency "1" and "0" in step S12.

In step S13, the autoscaling determination unit 12c sets the number of V1 to V4 to be increased or reduced (added/removed) (resource control setting) in accordance with the degrees of dependency "1" and "0" for each of V1 to V4. This resource control setting ends the dependency calculation phase.

After the above-described resource control setting, the autoscaling determination unit 12c notifies the compute 11 of an operation start instruction in step S14. After receiving this notification, the data collection unit 11a of the compute 11 collects data of an amount of resources used from the VMs/containers V1 to V4 in step S15 and transfers the collected data to the data collection unit 12a of the controller 12 in step S16. The data collection unit 12a notifies the autoscaling determination unit 12c of the transferred collected data in step S17.

In step S18, the autoscaling determination unit 12c determines autoscaling of how many of V1 to V4 needs to be increased or reduced according to the resource control setting of step S13 described above, that is, the degrees of dependency "1" and "0" indicating a dependency between the performance (latency) of each of the VMs/containers V1 to V4 and the number of VMs/containers as follows.

That is, the autoscaling determination unit 12c obtains a resource control amount for performing control to increase the number of VMs/containers V1 and V4 having a degree of dependency of "1" and not to increase the number of VMs/containers V2 and V3 having a degree of dependency of "0". The autoscaling determination unit 12c notifies the resource control unit 11b of the compute 11 of the obtained resource control amount in step S19.

In step S20, the resource control unit 11b performs scale-out control to increase the number of VMs/containers V1 and V4 and not to increase the number of VMs/containers V2 and V3 according to the notified resource control amount as illustrated in FIG. 4. The number of VMs/containers V1 and V4 is increased by this control. Note that, when the number of V1 and V4 is to be reduced, scale-in control is performed according to the resource control amount based on the degree of dependency "1" or "0".

Effects of Embodiment Effects of the autoscale-type performance assurance system 10 according to the present embodiment will be described. The system 10 performs autoscaling to increase or reduce the number of VMs/containers V1 to V4 generated in network-connected servers and resources typified by CPUs and memories of the VMs/containers V1 to V4 by adding or removing them.

(1) A compute 11 configured to have, in a server, a plurality of types of VMs/containers V1 to V4, a data collection unit 11a that collects a resource allocation amount for the VMs/containers V1 to V4, and a resource control unit 11b that performs autoscaling to increase or reduce the resources of the VMs/containers V1 to V4 by increasing or removing them is provided. Further, a controller 12 configured to have, in a server, a dependency calculation unit 12b that calculates, based on the resource allocation amount collected by the data collection unit 11a, a degree of dependency indicating whether the resource allocation amount is dependent on a performance related to the VMs/containers V1 to V4 for providing a communication service quality, and an autoscaling determination unit 12c that obtains a resource control amount for increasing or reducing only resources related to the calculated degree of dependency indicating being dependent is provided. Then, the resource control unit 11b is configured to increase or reduce the resources of the corresponding VMs/containers V1 to V4 by executing autoscaling according to the resource control amount obtained by the autoscaling determination unit 12c.

According to this configuration, based on the resource allocation amount of the plurality of types of VMs/containers V1 to V4, whether the resource allocation amount has a degree of dependency on the performance of the VMs/containers V1 to V4 is obtained, and only resources in the resource allocation amount corresponding to being dependent can be increased or reduced by the execution (operation) of autoscaling. As a result, it is not necessary to manually set an increase or reduction of resources as in the related art and thus time and effort are not required, and therefore in the present invention, it is possible to appropriately control a resource allocation amount such as the number of VMs/containers V1 to V4 by executing autoscaling.

(2) The dependency calculation unit 12b uses the number of VMs/containers V1 to V4 as a resource allocation amount to obtain a correlation coefficient between the number of V1 to V4 and performance and calculates a degree of dependency indicating being dependent when the obtained correlation coefficient exceeds a predetermined threshold value. The autoscaling determination unit 12c obtains a resource control amount for increasing or reducing only the number of V1 to V4 for the resource allocation amount corresponding to the calculated degree of dependency "1" indicating being dependent. The resource control unit 11b is configured to increase or reduce the number of corresponding VMs/containers V1 to V4 by executing autoscaling according to the resource control amount.

According to this configuration, the following effects are obtained. Normally, if a correlation coefficient between the performance and the number of VMs/containers V1 to V4 is large, the performance is improved when the number of V1 to V4 is increased. For this reason, a threshold value for determining the correlation coefficient for improving the performance is predetermined, and when the correlation coefficient exceeds the threshold value, only the number of V1 to V4 for the resource allocation amount corresponding to a degree of dependency indicating that the number of V1 to V4 is dependent on a performance is increased or reduced. Thus, performance can be improved according to, for example, the increased number of VMs/containers V1 to V4.

(3) The dependency calculation unit 12b uses the number of resource allocation sets of the VMs/containers V1 to V4 as a resource allocation amount to obtain a correlation coefficient between the number of resource allocation sets and performance. Then, the dependency calculation unit 12b calculates a degree of dependency indicating being dependent when the obtained correlation coefficient exceeds a threshold value. The autoscaling determination unit 12c obtains a resource control amount by which only the number of resource allocation sets of the VMs/containers V1 to V4 related to the calculated degree of dependency indicating being dependent is to be increased or reduced. The resource control unit 11b is configured to increase or reduce the number of resource allocation sets of the corresponding VMs/containers V1 to V4 by executing autoscaling according to the resource control amount.

According to this configuration, the following effects are obtained. Normally, if a correlation coefficient between the performance and the number of resource allocation sets of the VMs/containers V1 to V4 is large, the performance is improved when the number of VM/containers V1 to V4 is increased. For this reason, a threshold value for determining the correlation coefficient for improving the performance is predetermined, and when the correlation coefficient exceeds the threshold value, only the number of resource allocation sets of the VMs/containers V1 to V4 that is the resource allocation amount corresponding to a degree of dependency indicating that the number of resource allocation sets is dependent on a performance is increased or reduced. Thus, performance can be improved according to, for example, the VMs/containers V1 to V4 for which the number of resource allocation sets is increased.

(4) The dependency calculation unit 12b uses the number of VMs/containers V1 to V4 as a resource allocation amount to obtain a correlation coefficient between the number of the VMs/containers V1 to V4 and performance and calculate a weight constant for each of the VMs/containers V1 to V4 according to the obtained correlation coefficient. The autoscaling determination unit 12c determines the number of VMs/containers V1 to V4 to increase or reduce according to the calculated weight constant for each of the VMs/containers V1 to V4, and obtains a resource control amount for increasing or reducing the number of each of the VMs/containers V1 to V4 at a ratio at which the number of each of the VMs/containers V1 to V4 is to be increased or reduced. The resource control unit 11b is configured to increase or reduce the number of corresponding VMs/containers V1 to V4 by executing autoscaling according to the resource control amount.

According to this configuration, the number of each of the VMs/containers V1 to V4 is increased or reduced during execution of autoscaling at the ratio at which the number of each of the VMs/containers V1 to V4 is to be increased or reduced according to the ratio of the weight constants for each of the VMs/containers V1 to V4, and thus the overall performance of the VMs/containers V1 to V4 can be optimally improved.

(5) The dependency calculation unit 12b uses the number of resource allocation sets of the VMs/containers V1 to V4 to obtain a correlation coefficient between the number of resource allocation sets and performance and calculate a weight constant for each of the VMs/containers V1 to V4 according to the obtained correlation coefficient. The autoscaling determination unit 12c determines the number of VMs/containers V1 to V4 to increase or reduce according to the calculated weight constant for each of the VMs/containers V1 to V4, and obtains a resource control amount for increasing or reducing the number of resource allocation sets for each of the VMs/containers V1 to V4 at a ratio at which the number of each of the VMs/containers V1 to V4 is to be increased or reduced. The resource control unit 11b is configured to increase or reduce the number of resource allocation sets for each of the corresponding VMs/containers V1 to V4 by executing autoscaling according to the resource control amount.

According to this configuration, the number of resource allocation sets for each of the VMs/containers V1 to V4 is increased or reduced during execution of autoscaling at the ratio at which the number of each of the VMs/containers V1 to V4 is to be increased or reduced according to the ratio of the weight constants for each of the VMs/containers V1 to V4, and thus the overall performance of the VMs/containers V1 to V4 can be optimally improved.

(6) The dependency calculation unit 12b uses the number of VMs/containers V1 to V4 as a resource allocation amount to obtain a correlation coefficient between the number of VMs/containers V1 to V4 and performance. The dependency calculation unit 12b defines the degree of dependency when the obtained correlation coefficient exceeds a predetermined threshold value as being dependent and the degree of dependency when the obtained correlation coefficient is equal to or less than the threshold value as being not dependent. Then, the dependency calculation unit 12*b* calculates a weight constant for each of the VMs/containers V1 to V4 according to the correlation coefficient for each of the VMs/containers V1 to V4 being dependent, except for the VMs/containers V1 to V4 being not dependent. The autoscaling determination unit 12*c* determines the number of VMs/containers V1 to V4 to increase or reduce according to the calculated weight constant for each of the VMs/containers V1 to V4, and obtains a resource control amount for increasing or reducing the number of each of the VMs/containers V1 to V4 at a ratio at which the number of each of the VMs/containers V1 to V4 is to be increased or reduced. The resource control unit 11*b* is configured to increase or reduce the number of corresponding VMs/containers V1 to V4 by executing autoscaling according to the resource control amount.

According to this configuration, the VMs/containers V1 to V4 having the correlation coefficient between the number of VMs/containers V1 to V4 and performance equal to or less than the threshold value indicating being not dependent are excluded. A weight constant for each of the VMs/containers V1 to V4 is calculated according to the correlation coefficient of each of the remaining VMs/containers V1 to V4 being dependent, and the number of each of the VMs/containers V1 to V4 is increased or reduced at a ratio at which the number of each of the VMs/containers V1 to V4 is to be increased or reduced according to the weight constant. Thus, the overall performance of the VMs/containers V1 to V4 can be optimally improved.

(7) The dependency calculation unit 12*b* uses the number of resource allocation sets of the VMs/containers V1 to V4 as a resource allocation amount to obtain a correlation coefficient between the number of resource allocation sets and performance. The dependency calculation unit 12*b* defines the degree of dependency when the obtained correlation coefficient exceeds a predetermined threshold value as being dependent and the degree of dependency when the obtained correlation coefficient is equal to or less than the threshold value as being not dependent. Then, the dependency calculation unit 12*b* calculates a weight constant for each of the VMs/containers V1 to V4 according to the correlation coefficient for each of the VMs/containers V1 to V4 being dependent, except for the VMs/containers V1 to V4 being not dependent. The autoscaling determination unit 12*c* determines the number of VMs/containers V1 to V4 to increase or reduce according to the calculated weight constant for each of the VMs/containers V1 to V4, and obtains a resource control amount for increasing or reducing the number of resource allocation sets for each of the VMs/containers V1 to V4 at a ratio at which the number of each of the VMs/containers V1 to V4 is to be increased or reduced. The resource control unit 11*b* is configured to increase or reduce the number of resource allocation sets for each of the corresponding VMs/containers V1 to V4 by executing autoscaling according to the resource control amount.

According to this configuration, the VMs/containers V1 to V4 having the correlation coefficient between the number of resource allocation sets of the VMs/containers V1 to V4 and performance equal to or less than the threshold value indicating being not dependent are excluded. The weight constant for each of the VMs/containers V1 to V4 is calculated according to correlation coefficient of each of the remaining VMs/containers V1 to V4 being dependent, and the number of resource allocation sets for each of the VMs/containers V1 to V4 is increased or reduced at a ratio at which the number of each of the VMs/containers V1 to V4 is to be increased or reduced according to the weight constant. Thus, the overall performance of the VMs/containers V1 to V4 can be optimally improved.

In addition, a specific configuration can be appropriately changed without departing from the gist of the present invention.

REFERENCE SIGNS LIST

10 Autoscale-type performance assurance system
11 Compute (first server)
11*a* Data collection unit
11*b* Resource control unit
12 Controller (second server)
12*a* Data collection unit
12*b* Dependency calculation unit
12*c* Autoscaling determination unit
13 DB
V1 to V4 VM/container

The invention claimed is:

1. An autoscale-type performance assurance system configured to perform autoscaling to increase or reduce, through addition or deletion, a number of virtual machines (VMs)/containers, which are either or both of VMs and containers generated in a network-connected server and resources typified by a central processing unit (CPU) and a memory of each of the number of VMs/containers, the autoscale-type performance assurance system comprising:
   a first server including:
      a plurality of types of the number of VMs/containers,
      a collection unit configured to collect a resource allocation amount of each of the number of VMs/containers, and
      a control unit configured to perform autoscaling to increase or reduce resources of each of the number of VMs/containers; and
   a second server including:
      a calculation unit configured to, based on the resource allocation amount that is collected, calculate a degree of dependency indicating whether the resource allocation amount is dependent on a performance related to the number of VMs/containers for providing a communication service quality, and
      a determination unit configured to obtain a resource control amount for increasing or reducing only resources related to the degree of dependency indicating being dependent that is calculated,
   wherein the control unit increases or reduces the resources related to the degree of dependency indicating being dependent of the number of VMs/containers by executing autoscaling according to the resource control amount obtained by the determination unit.

2. The autoscale-type performance assurance system according to claim 1,
   wherein the calculation unit obtains a correlation coefficient between the number of VMs/containers serving as the resource allocation amount and the performance and calculates the degree of dependency, as being dependent, when the correlation coefficient that is obtained exceeds a predetermined threshold value,
   the determination unit obtains a resource control amount for increasing or reducing only the number of VMs/containers related to the degree of dependency indicating being dependent that is calculated, and the control unit increases or reduces the number of VMs/containers by executing autoscaling according to the resource control amount.

3. The autoscale-type performance assurance system according to claim 1,
wherein the calculation unit obtains a correlation coefficient between a number of resource allocation sets of the VMs/containers serving as the resource allocation amount and the performance and calculates the degree of dependency, as being dependent, when the correlation coefficient that is obtained exceeds a predetermined threshold value,
the determination unit obtains a resource control amount for increasing or reducing only the number of resource allocation sets of the VMs/containers related to the degree of dependency indicating being dependent that is calculated, and
the control unit increases or reduces the number of resource allocation sets of the VMs/containers by executing autoscaling according to the resource control amount.

4. The autoscale-type performance assurance system according to claim 1,
wherein the calculation unit obtains a correlation coefficient between the number of VMs/containers serving as the resource allocation amount and the performance and calculates a weight constant for each of the number of VMs/containers according to the correlation coefficient that is obtained,
the determination unit determines a number of each of the number of VMs/containers to increase or reduce according to the weight constant of each of the number of VMs/containers that is calculated and obtains a resource control amount for increasing or reducing the number of each of the number of VMs/containers at a ratio at which the number of each of the number of VMs/containers is to be increased or reduced, and
the control unit increases or reduces the number of VMs/containers by executing autoscaling according to the resource control amount.

5. The autoscale-type performance assurance system according to claim 1,
wherein the calculation unit uses a number of resource allocation sets of the number of VMs/containers to obtains a correlation coefficient between the number of resource allocation sets and the performance and calculate a weight constant for each of the number of VMs/containers according to the correlation coefficient that is obtained,
the determination unit determines the number of each of the number of VMs/containers to increase or reduce according to the weight constant of each of the number of VMs/containers that is calculated and obtains a resource control amount for increasing or reducing the number of resource allocation sets for each of the number of VMs/containers at a ratio at which the number of each of the number of VMs/containers is to be increased or reduced, and
the control unit increases or reduces the number of resource allocation sets for each of the number of VMs/containers by executing autoscaling according to the resource control amount.

6. The autoscale-type performance assurance system according to claim 1,
wherein the calculation unit obtains a correlation coefficient between the number of VMs/containers serving as the resource allocation amount and the performance, defines the degree of dependency when the correlation coefficient that is obtained exceeds a threshold value that is predetermined as being dependent and the degree of dependency when the correlation coefficient that is obtained is equal to or less than the threshold value as being not dependent, and calculates a weight constant for each of the number of VMs/containers according to the correlation coefficient of each of the number of VMs/containers being dependent other than VMs/containers being not dependent,
the determination unit determines a number of each of the VMs/containers to increase or reduce according to the weight constant of each of the VMs/containers that is calculated and obtains a resource control amount for increasing or reducing the number of each of the number of VMs/containers at a ratio at which the number of each of the VMs/containers is to be increased or reduced, and
the control unit increases or reduces the number of VMs/containers by executing autoscaling according to the resource control amount.

7. The autoscale-type performance assurance system according to claim 1,
wherein the calculation unit obtains a correlation coefficient between a number of resource allocation sets of the VMs/containers serving as the resource allocation amount and the performance, defines the degree of dependency when the correlation coefficient that is obtained exceeds a threshold value that is predetermined as being dependent and the degree of dependency when the correlation coefficient that is obtained is equal to or less than the threshold value as being not dependent, and calculates a weight constant for each of the number of VMs/containers according to the correlation coefficient of each of the number of VMs/containers being dependent other than VMs/containers being not dependent,
the determination unit determines a number of each of the number of VMs/containers to increase or reduce according to the weight constant of each of the number of VMs/containers that is calculated and obtains a resource control amount for increasing or reducing the number of resource allocation sets for each of the number of VMs/containers at a ratio at which the number of each of the number of VMs/containers is to be increased or reduced, and
the control unit increases or reduces the number of resource allocation sets for each of the number of VMs/containers by executing autoscaling according to the resource control amount.

8. An autoscale-type performance assurance method of a system configured to perform autoscaling to increase or reduce, through addition or deletion, the number of virtual machines (VMs/containers, which are either or both of VMs and containers generated in a network-connected server and resources typified by a central processing unit (CPU) and a memory of each of the number of VMs/containers,
wherein the system includes a first server in which a plurality of types of the number of VMs/containers are generated and a second server connected to the first server, the method comprising:
by the first server, collecting a resource allocation amount of each of the number of VMs/containers,
by the second server, based on the resource allocation amount that is collected, calculating a degree of dependency indicating whether the resource allocation amount is dependent on a performance related to the number of VMs/containers for providing a communication service quality, by the second server, obtaining a resource control amount for increasing or reducing only resources related to the degree of dependency indicating being dependent that is calculated, and by the first server, increasing or reducing the resources related to the degree of dependency indicating being dependent of the number of VMs/containers by executing autoscaling according to the resource control amount.

\* \* \* \* \*